United States Patent
Tang (10) Patent No.: US 9,133,822 B2
(45) Date of Patent: Sep. 15, 2015

(54) HORIZONTALLY-LAID TANGENTIAL ROOFTOP WIND POWER GENERATOR

(71) Applicant: Wai Yee Tang, Hong Kong (HK)

(72) Inventor: Wai Yee Tang, Hong Kong (HK)

(*) Notice: Subject to any disclaimer, the term of this patent is extended or adjusted under 35 U.S.C. 154(b) by 109 days.

(21) Appl. No.: 13/929,824

(22) Filed: Jun. 28, 2013

(65) Prior Publication Data

US 2014/0167417 A1    Jun. 19, 2014

(30) Foreign Application Priority Data

Dec. 14, 2012 (CN) .......................... 2012 1 0545387

(51) Int. Cl.

| | | |
|---|---|---|
| F03D 9/00 | (2006.01) |
| H02P 9/04 | (2006.01) |
| E04D 13/18 | (2014.01) |
| E04H 14/00 | (2006.01) |
| F24J 2/46 | (2006.01) |
| F03D 3/04 | (2006.01) |
| E04D 13/10 | (2006.01) |
| H02J 7/35 | (2006.01) |
| F03D 11/04 | (2006.01) |
| F03D 3/00 | (2006.01) |
| F24J 2/04 | (2006.01) |
| H02J 7/34 | (2006.01) |
| E04D 3/08 | (2006.01) |
| F24J 2/34 | (2006.01) |

(52) U.S. Cl.
CPC ............ *F03D 3/0427* (2013.01); *E04D 13/103* (2013.01); *F03D 3/002* (2013.01); *F03D 11/04* (2013.01); *H02J 7/35* (2013.01); *E04D 2003/0818* (2013.01); *F05B 2240/9112* (2013.01); *F24J 2/045* (2013.01); *F24J 2/345* (2013.01); *H02J 7/34* (2013.01); *Y02B 10/22* (2013.01); *Y02B 10/30* (2013.01); *Y02E 10/728* (2013.01); *Y02E 10/74* (2013.01); *Y02E 10/766* (2013.01)

(58) Field of Classification Search
CPC ....... F03D 3/0427; F03D 3/002; F03D 11/04; E04D 13/103; F24J 2/045; H02J 7/35; F05B 2240/9112; Y02E 10/74
USPC .............. 290/44, 55; 415/2.1, 7, 4.1, 4.2, 4.4, 415/4.5, 907; 416/132 B
See application file for complete search history.

(56) References Cited

U.S. PATENT DOCUMENTS

| | | | | |
|---|---|---|---|---|
| 3,714,449 A | * | 1/1973 | De Bella | 290/1 C |
| 5,394,016 A | * | 2/1995 | Hickey | 290/55 |
| 6,097,104 A | * | 8/2000 | Russell | 290/54 |
| 6,601,348 B2 | * | 8/2003 | Banks et al. | 52/25 |
| 7,172,386 B2 | * | 2/2007 | Truong et al. | 415/4.1 |
| 2002/0050719 A1 | * | 5/2002 | Caddell et al. | 290/54 |
| 2003/0077121 A1 | * | 4/2003 | Chun | 404/71 |
| 2004/0041405 A1 | * | 3/2004 | Seki | 290/54 |
| 2007/0241567 A1 | * | 10/2007 | Platt | 290/55 |
| 2008/0042446 A1 | * | 2/2008 | Kurtz | 290/55 |

(Continued)

FOREIGN PATENT DOCUMENTS

CN            201539982 U   *   8/2010

*Primary Examiner* — Tulsidas C Patel
*Assistant Examiner* — Charles Reid, Jr.

(57) ABSTRACT

The present application is directed to a horizontally-laid tangential rooftop wind power generator comprising: a generator mounted on a chassis and coupled to a tangential fan wheel or a plurality of tangential fan wheels, all housed in a cover with two long fan openings one at each of the two sides. Wind-directing panels extend outwardly from the two fan openings to form two shrouded duct openings.

18 Claims, 7 Drawing Sheets

(56) References Cited

U.S. PATENT DOCUMENTS

| | | | |
|---|---|---|---|
| 2008/0303287 A1* | 12/2008 | Meheen | 290/55 |
| 2010/0034649 A1* | 2/2010 | Taylor | 415/208.1 |
| 2010/0129193 A1* | 5/2010 | Sherrer | 415/1 |
| 2011/0042948 A1* | 2/2011 | Margiott et al. | 290/2 |
| 2011/0084498 A1* | 4/2011 | Lemus | 290/1 R |
| 2011/0175366 A1* | 7/2011 | Steinlechner | 290/55 |
| 2011/0250069 A1* | 10/2011 | Quintal | 416/111 |
| 2011/0297659 A1* | 12/2011 | Bixler et al. | 219/201 |
| 2012/0032447 A1* | 2/2012 | Bang-Moeller | 290/54 |
| 2012/0043761 A1* | 2/2012 | White | 290/55 |
| 2012/0080884 A1* | 4/2012 | Gagnon | 290/55 |
| 2013/0119661 A1* | 5/2013 | Pringle et al. | 290/44 |

* cited by examiner

Section "A--A"

Fig. 11

Section "B--B"

HORIZONTALLY-LAID TANGENTIAL ROOFTOP WIND POWER GENERATOR

CROSS REFERENCE TO RELATED PATENT APPLICATIONS

The present application claims benefit of Chinese patent application No. 201210545387.X, which filed on Dec. 14, 2012, the entire contents of which are hereby incorporated by reference.

FIELD OF THE TECHNOLOGY

The present application generally relates to power generator, specifically relates to a horizontally-laid tangential rooftop wind power generator.

BACKGROUND

In general, wind power generators can be categorized into two types, namely (a) vertical axis wind power generator and (b) horizontal axis wind power generator. In addition to having smaller wind-swept area, a vertical axis wind power generator always poses unbalanced thrust and torque on tower mast during operation while its returning wind blades head against incoming wind. Therefore, problems in association with low wind energy efficiency, high construction cost, excessive vibration and unbalanced torque hence incurring more maintenance cost and additional guy wires for balancing etc. are found in comparison with a horizontal axis wind power generator. Meanwhile, technology development for horizontal axis wind power generator is mature as reliability in operation with better power output efficiency has been recognized. Thus, horizontal axis wind powered generators are engaged in large scale wind farms all over the world.

A modern commercial wind farm is always located distant from cities at remote area where wind energy source is abundant. Voltage of electricity generated has to be stepped up prior to distribution of electrical power through distant transmission grids to energy consuming factories and cities. High costs in initial investment and thereafter maintenance, high loss of energy in transmission and high cost for power distribution are major problems which engineers and scientists are addressing for.

Wind energy output for a wind power generator is functional to wind-swept area of blades, height of nacelle above ground, and wind speed in accordance with Wind Formula. In this regard, wind power generators are mounted on high towers or masts with large rotor span of wind blades. Apart from high initial investment cost, a wind power generator must be installed distant from building due to vibration and noises in operation thereby prohibiting application of wind power generators in residential dwellings.

SUMMARY

According to one aspect, there is provided a horizontally-laid tangential rooftop wind power generator including: a chassis, a generator mounted on the chassis, at least one fan wheel mounted horizontally on the chassis and rotatably coupled to the generator, a cover with two opposite lateral fan openings to encase the generator and at least one fan wheel, a front shrouded duct and a rear shrouded duct each extending from the two opposite lateral fan openings of the fan wheel respectively; each shrouded duct being formed by a plurality of wind-directing panels extending outwardly from its corresponding fan opening.

The fan wheel may include a plurality of wind blades mounted tangentially on two rims of the fan wheel, each wind blade is a long and slim blade having a cross-sectional shape of an arc with two longitudinal edges slightly extended and folded backwards in line with the chord to form a wind augment zone at the underside of the wind blade to enhance efficiency in capturing wind energy.

Incoming wind is compressed and pressurized at a front wind augment zone defined by the front shrouded duct and the rooftop area such that the incoming wind is forced to diffuse through the fan wheel to enter into a rear shrouded duct region where it is negatively pressurized due to rapid expansion of air before discharging to open air.

An upper edge of a lower wind-directing panel of the front shrouded duct extends to a region at about ¼ diameter height of the fan wheel; while at the rear shrouded duct, a lower edge of an upper wind-directing panel extends to a region at about ¼ diameter height of the fan wheel, whereby the said lower and upper wind-directing panels guide passage of wind such that the fan wheel being encased inside the cover only rotates in one direction irrespective of the direction of incoming wind.

A rooftop wind power generator may be installed in synergy with a solar hot water system and wherein the rooftop wind power generator can be mounted directly on top of a rooftop hot water storage cistern with internal heating element provided therein and with a plurality of vacuum solar heat collector tubes extending from body of the hot water storage cistern, whereby electricity generated by the rooftop wind power generator can be fed to the heating element inside the hot water storage cistern to heat up water, and to a plurality of heater wires paved on surface of the vacuum solar heat collector tubes to melt away covering snow to enhance solar heat absorption efficiency.

The vacuum solar heat collecting tubes are arranged in two layers, wherein the tubes of the bottom layer are offset from the tubes of the upper layer such that any seepage of sunshine through the tubes of the top layer can be captured by the tubes of the bottom layer.

The horizontally-laid tangential rooftop wind power generator may further include a light reflective membrane placed at an underside of the vacuum solar heat collector tubes to reflect any seepage of sunshine through the vacuum solar heat collector tubes and the reflected sunshine from surrounding back to the vacuum solar heat collector tubes to enhance solar heat absorption efficiency.

The rooftop wind power generator may be installed in synergy with a split solar hot water system having a hot water storage cistern placed on ground and a plurality of flat solar heat collector panels mounted on roof, whereby electricity generated by the rooftop wind power generator can be fed to a heating element inside the hot water storage cistern to heat up water, and to a plurality of heater wires paved on surface of the flat solar heat collector panels to melt away covering snow to enhance solar heat absorption efficiency.

The rooftop wind power generator may be installed in synergy with a rooftop photo voltaic panel system having a plurality of photo voltaic panels, whereby electricity generated by the rooftop wind power generator can be fed to a plurality of heater wires paved on surface of the photo voltaic panels to melt away covering snow to enhance solar heat absorption efficiency.

A battery bank is incorporated in an electricity output circuit of the generator such that when the battery bank is fully charged, surplus electricity can be fed to the heating element inside the hot water storage cistern to heat up water, whereby the heating element may act as a dummy load for protection of a power control circuit.

The horizontally-laid tangential rooftop wind power generator disclosed in the present application has the following advantages:

1. Quiet operation with minimal vibration and noises such that the wind power generator can be mounted directly on rooftop of building in single unit or in modules to match with aesthetic appearance and to meet with requirement of electricity output.
2. Simple installation. It can be secured in position on rooftop by guy wires or directly mounted on top of a solar water storage cistern.
3. Work in synergy with other forms of solar energy harnessing system for examples: two types of solar hot water system and photo voltaic panel system. Reliable electricity and hot water supply may be viable all year round since it works 24 hours a day around the year.
4. Simple structure and high efficiency. The cost of wind power generator is low while its operation incurs minimal running and maintenance costs. Yet its efficiency in harnessing wind energy is ultra-high.
5. The foresaid advantages of horizontally-laid tangential rooftop wind power generators may help promote application of wind power generation worldwide hence consolidating the propagation of distributed energy and reduction in emission of carbon dioxide at large.
6. For reasons aforesaid, the horizontally-laid tangential rooftop wind power generator has an unlimited market potential.

BRIEF DESCRIPTION OF THE DRAWINGS

Below is a further description of the present application with combination of drawings and embodiments, in the drawings:

FIG. 4b is an A-A sectional view of FIG. 3, showing the same directional rotation of wind blades despite of a reversed pattern of air flow through the wind power generator of the application when wind coming in from a different direction with reference to FIG. 4a.

DETAILED DESCRIPTION

In order to illustrate further on the technical features, purpose and operation of the present application, a detailed description of specific embodiments of the present application with reference to the drawings is provided below.

Figure 1:
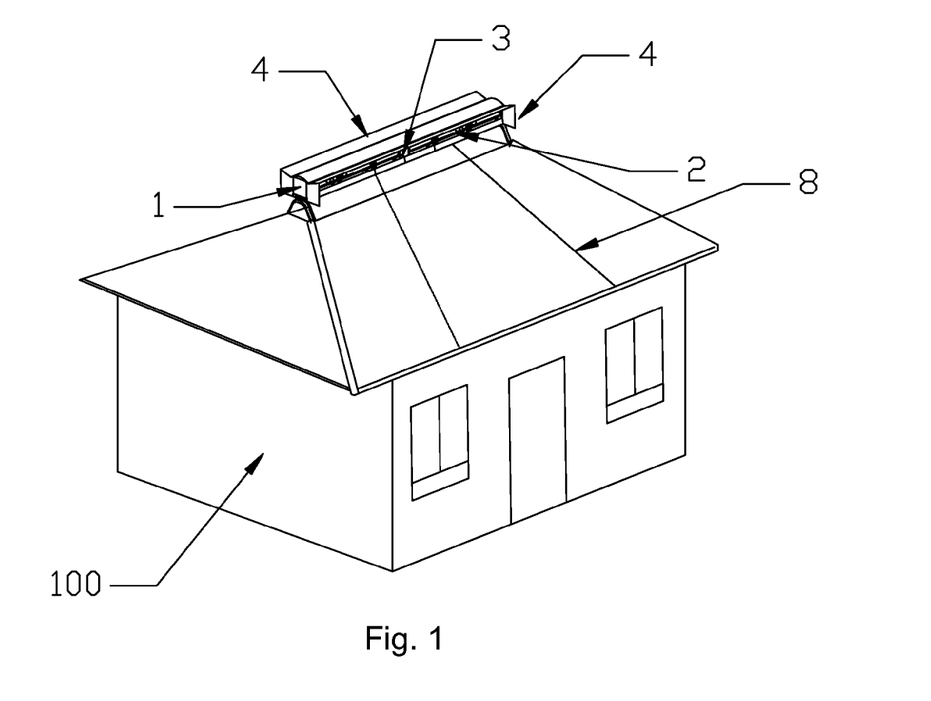
FIG. 1 is a perspective view of a modular installation of a horizontally-laid tangential rooftop wind power generator according to an embodiment of the present application.
Figure 2:
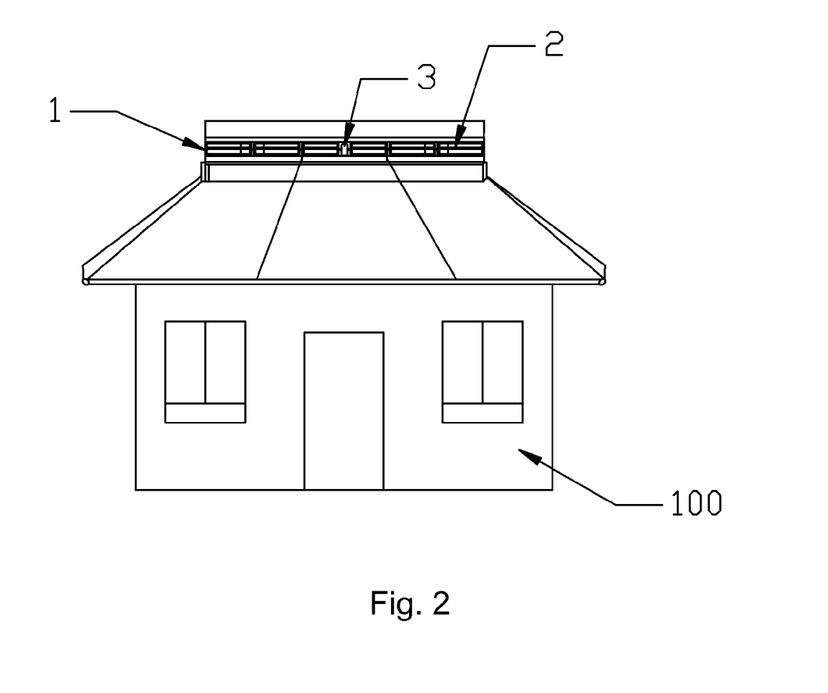
FIG. 2 is a front view of a modular installation of the horizontally-laid tangential rooftop wind power generator according to an embodiment of the present application.

FIG. 1 and FIG. 2 illustrate a modular installation of a horizontally-laid tangential rooftop wind power generator 1 mounted directly on ridge of rooftop of house 100 via guy wires 8 tied to eaves according to an embodiment of the present application.

Figure 3:
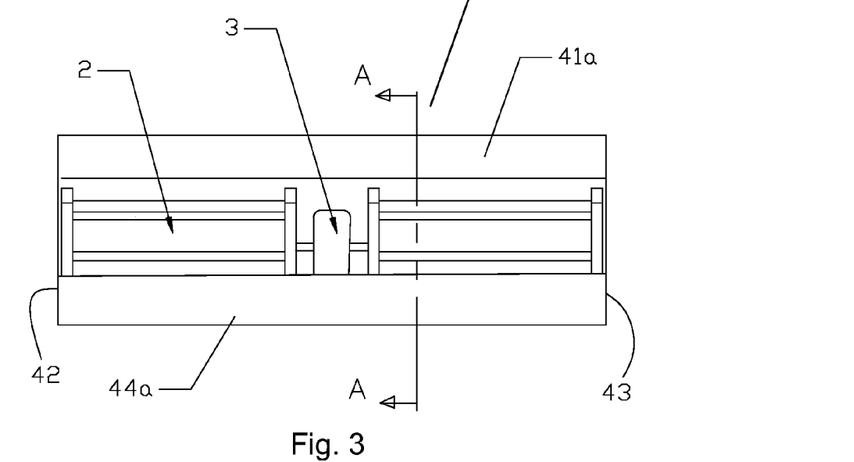
FIG. 3 is a front view of a single unit of a horizontally-laid tangential rooftop wind power generator according to an embodiment of the present application.

FIG. 3 illustrates the front view of a single unit of a horizontally-laid tangential rooftop wind power generator 1. The two ends of the axle of generator 3 couple to the two adjacent fan wheels 2. Generator 3 and fan wheels 2 are mounted on chassis 11 and encased in cover 12 with two long and narrow fan openings one on each side (See FIG. 4a). There are wind-directing panels comprising upper wind-directing panel 41a, lower wind-directing panels 44a, and side wind-directing panels 42 and 43 extending outwardly from the front opening to form a front shrouded duct. The upper edge of the front lower wind-directing panel 44a extends to a region of the fan opening at about ¼ diameter height of fan wheel 2. Wherein, the lower edge of the upper wind-directing panel 41b (See FIG. 4a) extends to a region of the fan opening at about ¼ diameter height of fan wheel 2.

Figure 4A:
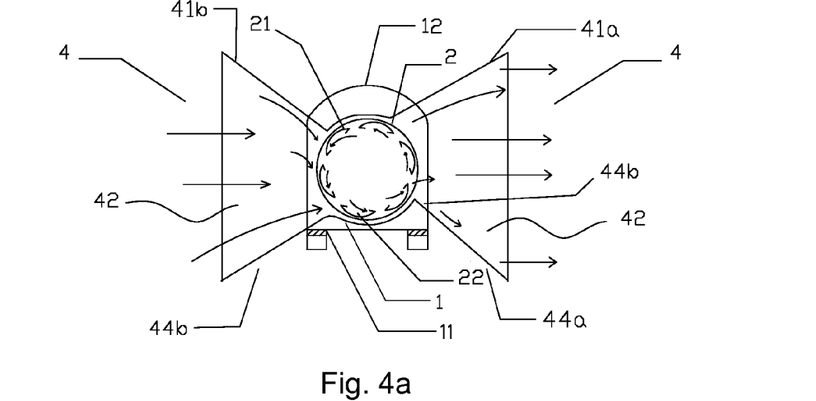
FIG. 4a is a 'A-A' sectional view of FIG. 3, showing the rotation of wind blades and pattern of air flow through a wind power generator of the application when wind coming in from one direction.
Figure 4B:
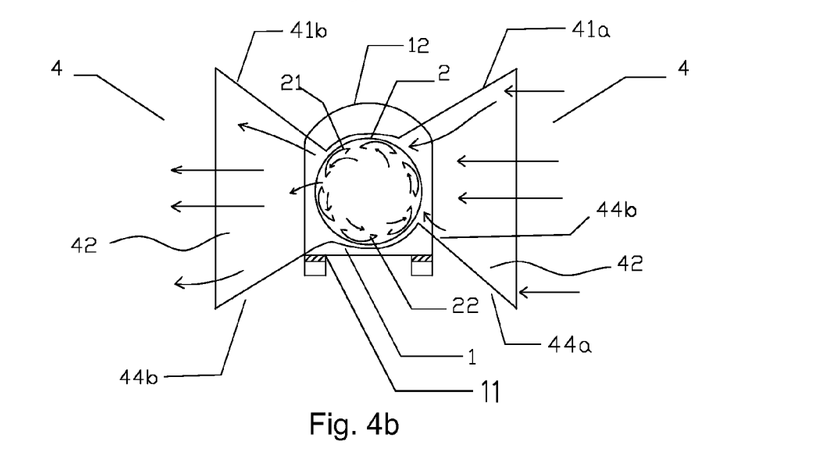

FIG. 4a and FIG. 4b are sectional views "A-A" of FIG. 3 illustrating the air flow pattern of wind passing through wind blades 21 mounted on rim of fan wheel 2. As described above, the arrangement of the upper wind-directing panel 41a and the lower wind-directing panel 44b together with the arrangement of the upper wind-directing panel 41b and the lower wind directing panel 44a in the present application allows one-way rotation of wind blades 21 with high efficiency since the returning wind blades 21 are shielded from heading against incoming wind irrespective of the direction of incoming wind whether coming from the south in summer or coming from the north in winter in the northern hemisphere. Incoming wind is compressed to form pressurized zone at the front shrouded duct opening in augment zone 4 and forced to diffuse through wind blades 21 inside cover 12 at higher speed as explained by Venturi Principle. As soon as wind enters into the rear shrouded duct region in the rear augment zone 4, partial vacuum is developed to form negative pressurized region due to rapid expansion of air hence helping draw in more volume of air from the front as explained by Bernoulli Principle, driving wind blades 21 to spin at much higher speed. The horizontally-laid tangential rooftop wind power generator 1 of the present application utilizes the vast area of a roof and a front shrouded duct to form augment zone 4 to catch energy of the accelerated wind due to altitude of building, up drifting of wind caused by building as well as the negative pressurized zone developed at the rear shrouded duct helping draw in more volume of air from the front.

Figure 5:
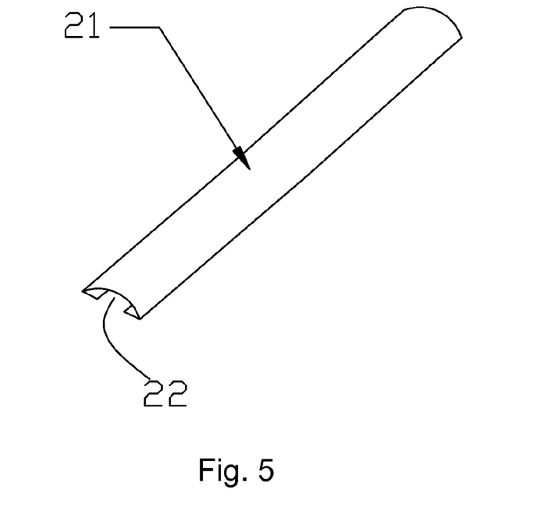
FIG. 5 is an illustrative view of a wind blade of a tangential fan wheel of a horizontally-laid tangential rooftop wind power generator having a cross-sectional shape of an arc with the edges of the two longer sides slightly extended and back folded in line with the chord to form augment zone at the underside of the wind blade according to an embodiment of the present application.

FIG. 5 describes the design of wind blade 21 in the present application. Each wind blade 21 is long and slim and is mounted tangentially on the two rims of fan wheel 2. Wind Blade 21 has a cross-sectional shape of an arc with edges of the two longer sides slightly extended and folded backward in line with the chord to form an augment zone 22 at the underside of wind blade 21 to enhance efficiency in harnessing wind energy.

Figure 6:
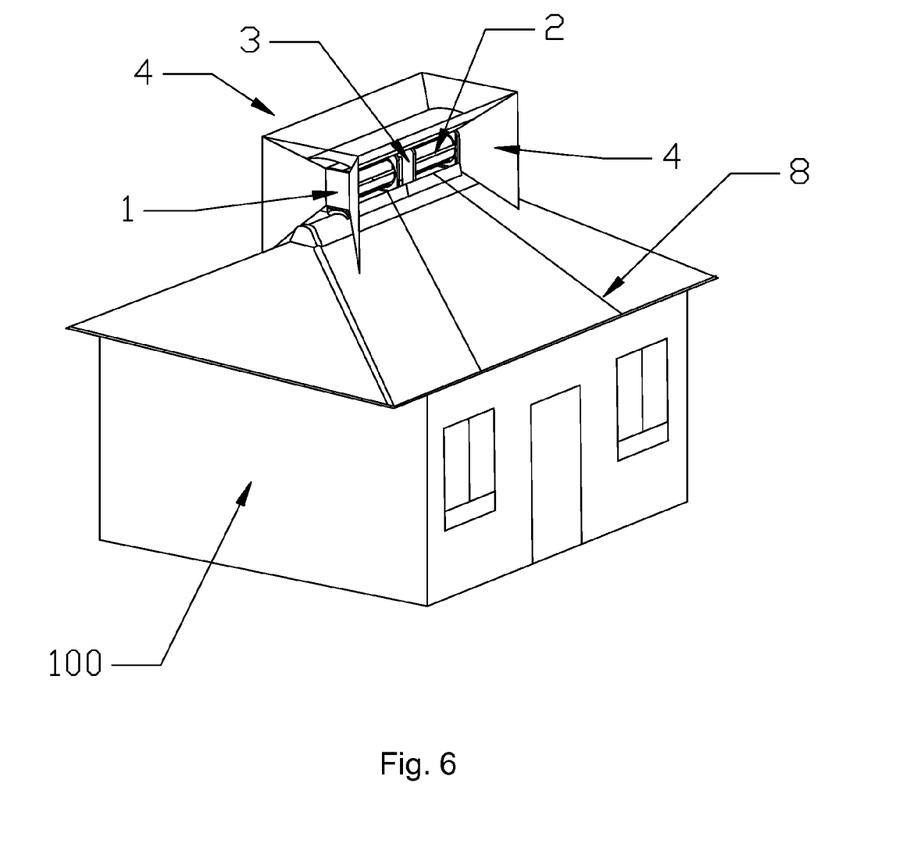
FIG. 6 is a perspective view of a single unit installation of a horizontally-laid tangential rooftop wind power generator on ridge of rooftop of a house according to an embodiment of the present application.
Figure 7:
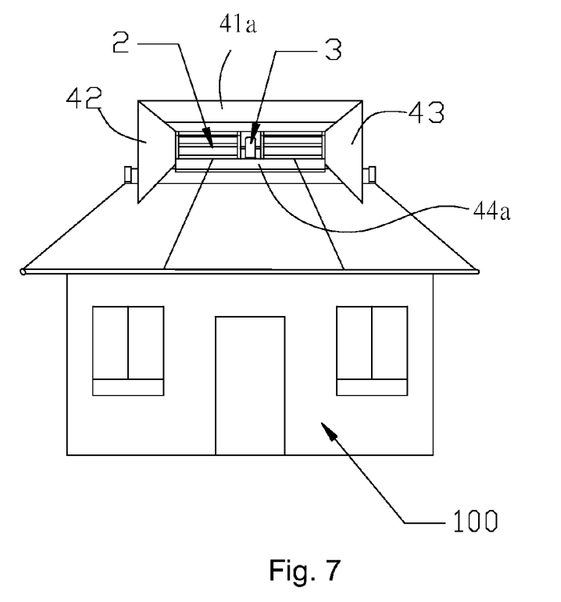
FIG. 7 is a front view of the single unit installation of the horizontally-laid tangential rooftop wind power generator on ridge of rooftop of a house.

Referring to FIGS. 6 and 7, FIG. 6 is a perspective view of a single unit installation of a horizontally-laid tangential rooftop wind power generator 1 whereas FIG. 7 is a front view illustrating an installation of a single unit of a horizontally-laid tangential rooftop wind power generator 1 on rooftop of house 100.

Figure 8:
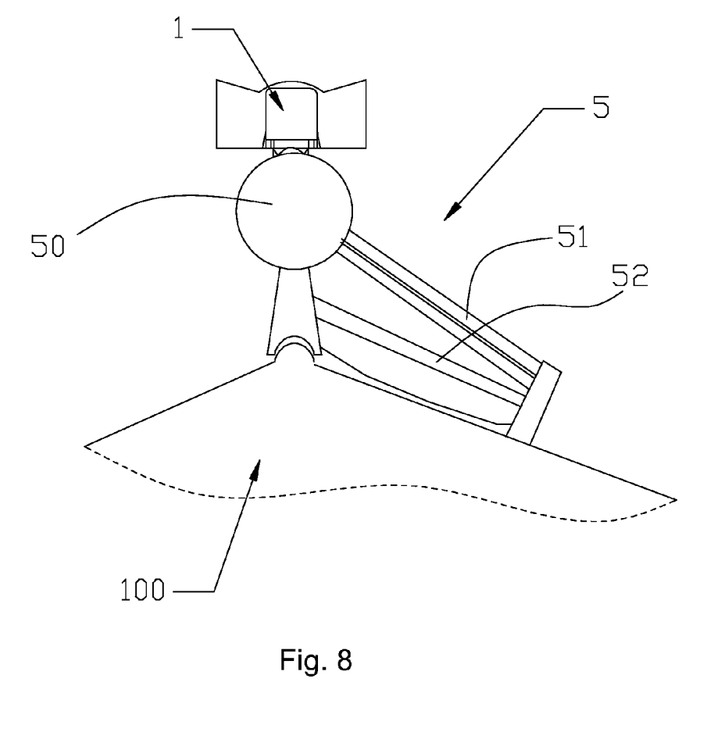
FIG. 8 is an illustrative side view of a single unit installation of a horizontally-laid tangential rooftop wind power generator on top of a solar hot water storage cistern on rooftop according to an embodiment of the present application.

Referring to FIG. 8, it is a side view illustrating the direct installation of a horizontally-laid tangential rooftop wind power generator 1 on top of a hot water storage cistern 50 of a solar hot water system 5 with double layered off-set vacuum solar heat collector tubes 51 extending from body of water cistern 50 and with a light reflective membrane 52 positioned at the underside of vacuum solar heat collector tubes 51 to reflect seepage of sunshine through vacuum solar heat collector tubes 51 and the reflected sunshine from surrounding back to vacuum solar heat collector tubes 51. Assuming a solar hot water cistern system 5 having a single layer with 24 pieces of vacuum solar heat collector tubes 51, an introduction of an off-set bottom layer tube arrangement implies an addition of 23 pieces of tubes i.e. 96% increase in quantity of heat collector tubes. Using a discount factor of 40% and with help from reflective membrane 52, a gross increase of at least 60% efficiency in harnessing solar energy may be appreciated while the cost increased will be minimal Electricity generated by the horizontally-laid tangential rooftop wind power generator 1 may be fed to the heating element inside the water storage cistern 50 to heat up water in cloudy days or when the battery bank of the horizontally-laid tangential rooftop wind power generator 1 has been fully charged, and to heater wires 53 paved on surface of vacuum solar heat collector tubes 51 to melt away covering snow to enhance solar heat absorption efficiency. In this connection, reliable electricity output and hot water supply may be assured and viable at all times around the year.

Figure 9:
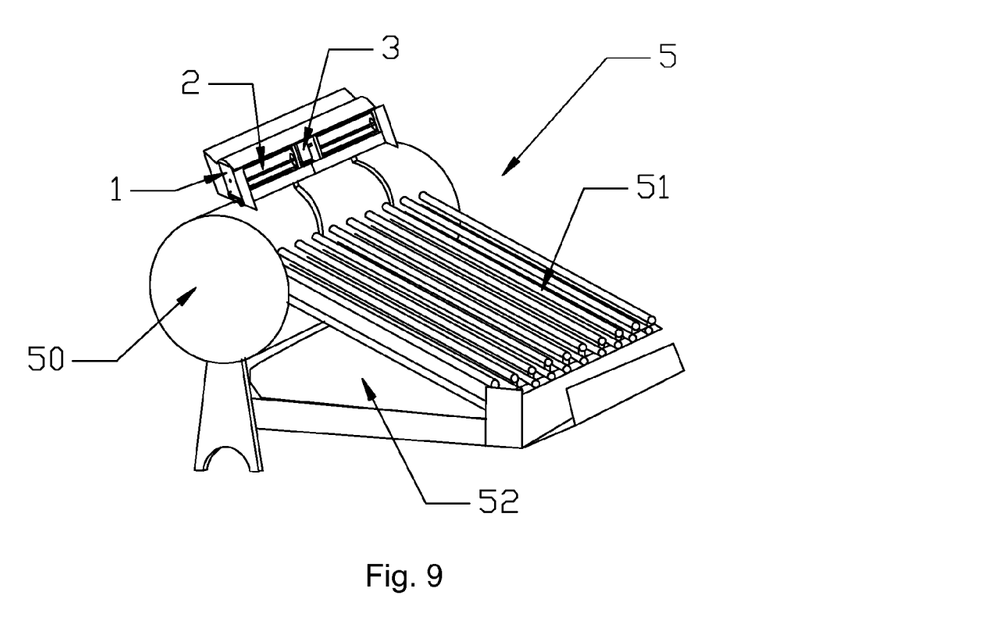
FIG. 9 is a perspective view of a single unit installation of a horizontally-laid tangential wind power generator mounted on top of a solar hot water storage cistern, showing the off-set double-layered tube arrangement according to an embodiment of the present application.

FIG. 9 is a perspective view of a single unit of a horizontally-laid tangential rooftop wind power generator 1 mounted directly on top of a solar hot water cistern 50 with fan wheels 2, generator 3 housed inside shrouded duct, double-layered vacuum solar heat collector tubes 51 and reflective membrane 52 placed at the underside of vacuum solar heat collector tubes 51 being shown. The function of reflective membrane 52 is to reflect seepage of sunshine through vacuum solar heat collector tubes 51 and the reflected sunshine from surrounding back to vacuum solar heat collector tubes 51 to enhance solar heat absorption efficiency.

Figure 10:
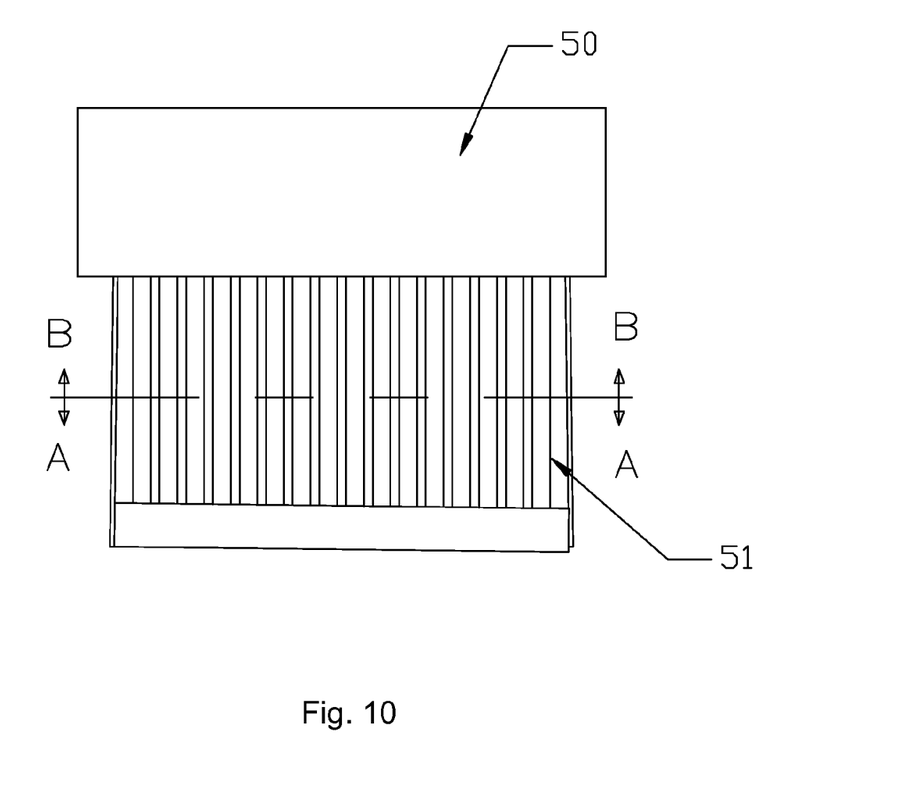
FIG. 10 is a plan view of a solar hot water storage system with vacuum solar heat collector tubes extending from body of the hot water storage cistern according to an embodiment of the present application.

FIG. 10 is a plan view of a solar hot water system 5 with vacuum solar heat collector tubes 51 extending from body of water cistern 50.

Figure 11:
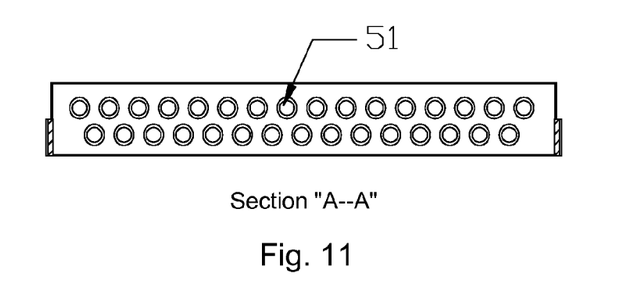
FIG. 11 is a "A-A" sectional view of FIG. 10 showing two off-set layers of vacuum solar heat collector tubes according to an embodiment of the present application.

FIG. 11 is the "A-A" sectional view of FIG. 10 showing two off-set layers of vacuum solar heat collector tubes 51 i.e. a top layer and a bottom layer. As foresaid, an addition of an off-set bottom layer of vacuum solar heat collector tubes 51 can increase 96% in quantity of vacuum glass tubes in comparison with a single-layered vacuum glass tube arrangement having 24 pieces of tubes, hence helping catch seepage of sunshine through top layer of vacuum solar heat collector tubes 51.

Figure 12:
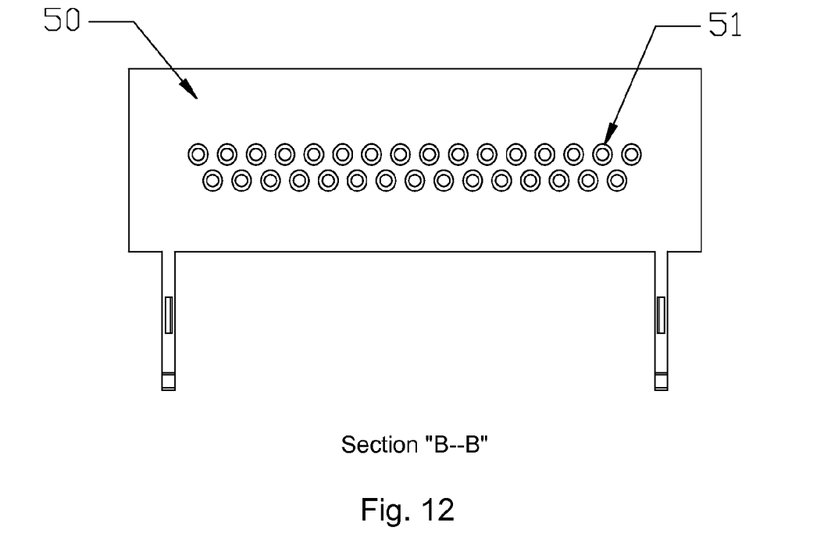
FIG. 12 is a "B-B" sectional view of FIG. 10 showing two off-set layers of vacuum solar heat collector tubes and the water storage cistern at background.

FIG. 12 is the "B-B" sectional view of FIG. 10 showing two off-set layers of vacuum solar heat collector tubes 51 and body of hot water storage cistern 50 in background.

Figure 13:
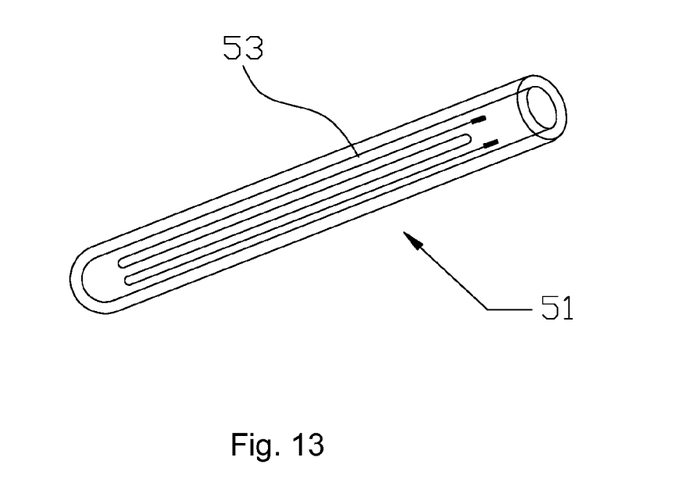
FIG. 13 is an illustrative view of a vacuum solar heat collecting glass tube with heater wires paved on surface of the tube according to an embodiment of the present application.

FIG. 13 is an illustrative view of a vacuum solar heat collector tube 51 with heater wires 53 paved on surface of vacuum solar heat collector tube 51. Electricity generated by a horizontally-laid tangential rooftop wind power generator 1 may be fed to heater wires 53 to melt away covering snow to enhance solar heat collection efficiency.

Figure 14:
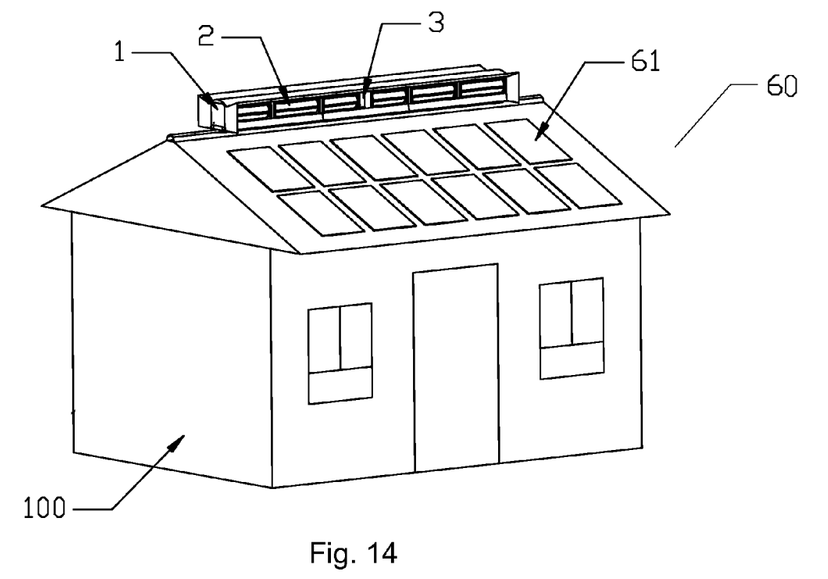
FIG. 14 is a perspective view of a modular installation of a horizontally-laid tangential rooftop wind power generator in synergy with a photo voltaic solar panel system according to an embodiment of the present application.

FIG. 14 is an illustrative view of a modular installation of a horizontally-laid tangential rooftop wind power generator 1 in synergy with photo voltaic solar system 60. Electricity generated by the horizontally-laid tangential rooftop wind power generator 1 may be fed to heater wires paved on surface of photo voltaic panels 61 to melt away covering snow to enhance solar light absorption efficiency.

Figure 15:
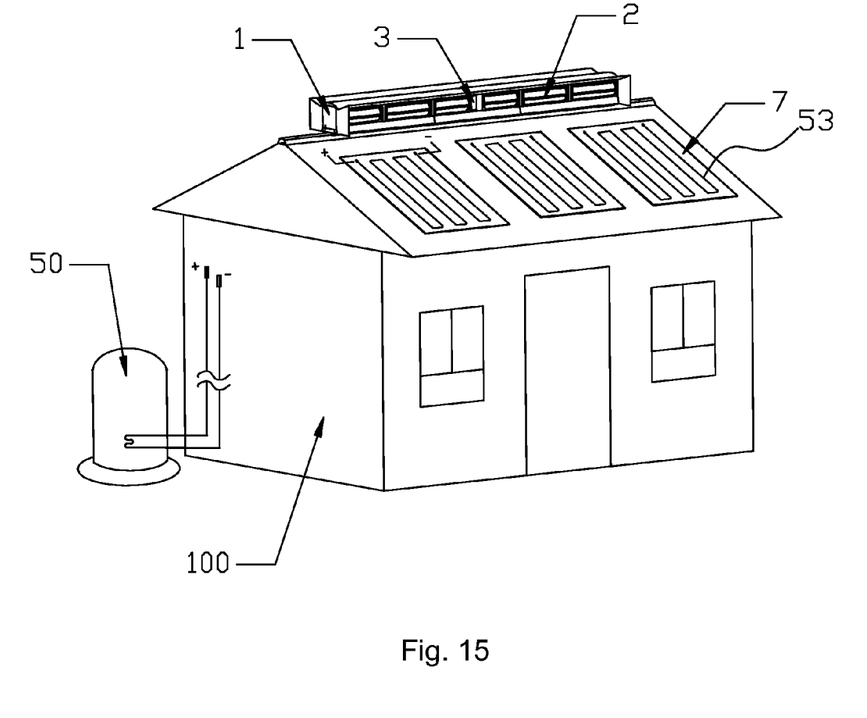
FIG. 15 is a perspective view of a modular installation of a horizontally-laid tangential rooftop wind power generator in synergy with a split solar hot water system with heater wires paved on surface of solar heat collector panels and with hot water storage cistern placed on ground according to an embodiment of the present application.

FIG. 15 is an illustrative view of a modular installation of a horizontally-laid tangential rooftop wind power generator 1 in synergy with a split solar hot water system with hot water storage cistern 50 placed on ground and flat solar heat collector panels 7 placed on rooftop with heater wires 53 paved on surface of flat solar heat collector panels 7. In the same manner as foresaid, electricity generated by the horizontally-laid tangential rooftop wind power generator 1 may be fed to heater wires 53 to melt away covering snow on solar heat collector panels 7 to enhance solar heat absorption efficiency.

As foresaid, the horizontally-laid tangential rooftop wind power generator of the present application well demonstrates the unique and innovative design of the system components namely: the unique design of wind-directing panels, wind blades, installation in synergy with solar hot water system and photo voltaic panels etc. The combined application of Venturi Principle, Bernoulli Principle and Wind Formula in utilization of a vast roof area together with two shrouded duct openings to form pressurized wind augment zone in the windward side and negative pressurized zone at the leeward side may triple wind speed passing through wind power generator, achieving exponential increase in wind energy output. Low equipment cost, ease in installation, flexible modular installation to meet with aesthetic appearance of building and requirement of electricity output, quiet operation and negligible running and maintenance costs etc. all help broad application of the invention device worldwide hence promoting the propagation of distributed energy and reduction in global emission of carbon dioxide at large. Also, the present application may engage the use of extra-low frictional coefficient plastic materials e.g. nylon, PTFE or alike in bearings and padding for axles and shafts such that outdoor maintenance may be further reduced to minimal.

The above combines the drawings and further explains the embodiments in the present application. However, the present application is not limited to the above specific embodiments. The above specific embodiments are merely illustrative and not limitative in nature. Those skilled in the relevant art can perform many other forms under the motivation of the present application without departing from the spirits and protective scope of the claims in the present application. All such will belong within the protection scope of the present application.

What is claimed is:

1. A horizontally-laid tangential rooftop wind power generator comprising:
    (a) a chassis;
    (b) a generator mounted on the chassis;
    (c) at least one fan wheel mounted horizontally on the chassis and rotatably coupled to the generator;
    (d) a cover with two opposite lateral fan openings to encase the generator and at least one fan wheel; and
    (e) a front shrouded duct and a rear shrouded duct each extending from the two opposite fan openings of the fan wheel respectively, each shrouded duct being formed by a plurality of wind-directing panels extending outwardly from its corresponding fan opening;
    wherein the fan wheel comprises a plurality of wind blades mounted tangentially on two rims of the fan wheel, each wind blade is a long and slim blade having a cross-sectional shape of an arc and with two longitudinal edges slightly extended and folded backwards in line with the chord to form a wind augment zone at the underside of wind blade to enhance efficiency in capturing wind energy;
    wherein incoming wind is compressed and positively pressurized at a front wind augment zone defined by the front shrouded duct and the rooftop such that incoming wind is forced to diffuse through the fan wheel at an accelerated speed prior to entering into a rear shrouded duct region where pressure is negative, hence helping draw in more volume of air from the front before discharge to open air;
    wherein an upper edge of a lower wind-directing panel of the front shrouded duct extends to a region at about ¼ diameter height of the fan wheel; while at the rear shrouded duct, a lower edge of an upper wind-directing panel extends to a region at about ¼ diameter height of the fan wheel, whereby the upper and lower wind-directing panels guide passage of wind such that the fan wheel being encased inside the cover is allowed to rotate in one direction only irrespective of the direction of incoming wind;
    wherein the rooftop wind power generator is mounted on the body of a solar hot water system with a heating element inside the hot water storage cistern, and with heater wires paved on surface of vacuum solar heat collector tubes extending from the body of the water storage cistern; the electricity generated by the rooftop wind power generator can be fed to the heating element inside the hot water storage cistern to heat up water, or to a plurality of heater wires paved on surface of the vacuum solar heat collector tubes to melt away covering snow to enhance solar heat absorption efficiency; and
    wherein the vacuum solar heat collector tubes are arranged in two layers, wherein the tubes of the bottom layer are offset from the tubes of the upper layer such that any seepage of sunshine through the tubes of the top layer can be captured by the tubes of the bottom layer.

2. A horizontally-laid tangential rooftop wind power generator comprising:
    (a) a chassis;
    (b) a generator mounted on the chassis;
    (c) at least one fan wheel mounted horizontally on the chassis and rotatably coupled to the generator;
    (d) a cover with two opposite lateral fan openings to encase the generator and at least one fan wheel; and
    (e) a front shrouded duct and a rear shrouded duct each extending from the two opposite fan openings of the fan wheel respectively, each shrouded duct being formed by a plurality of wind-directing panels extending outwardly from its corresponding fan opening;
    wherein the fan wheel comprises a plurality of wind blades mounted tangentially on two rims of the fan wheel, each wind blade is a long and slim blade having a cross-sectional shape of an arc and with two longitudinal edges slightly extended and folded backwards in line with the chord to form a wind augment zone at the underside of wind blade to enhance efficiency in capturing wind energy;
    wherein incoming wind is compressed and positively pressurized at a front wind augment zone defined by the front shrouded duct and the rooftop such that incoming wind is forced to diffuse through the fan wheel at an accelerated speed prior to entering into a rear shrouded duct region where pressure is negative, hence helping draw in more volume of air from the front before discharge to open air; and
    wherein an upper edge of a lower wind-directing panel of the front shrouded duct extends to a region at about ¼ diameter height of the fan wheel; while at the rear shrouded duct, a lower edge of an upper wind-directing panel extends to a region at about ¼ diameter height of the fan wheel, whereby the upper and lower wind-directing panels guide passage of wind such that the fan wheel being encased inside the cover is allowed to rotate in one direction only irrespective of the direction of incoming wind.

3. The horizontally-laid tangential rooftop wind power generator according to claim 2, wherein the rooftop wind power generator is mounted on the body of a solar hot water system with a heating element inside the hot water storage cistern, and with heater wires paved on surface of vacuum solar heat collector tubes extending from the body of the water storage cistern; the electricity generated by the rooftop wind power generator can be fed to the heating element inside the hot water storage cistern to heat up water, or to a plurality of heater wires paved on surface of the vacuum solar heat collector tubes to melt away covering snow to enhance solar heat absorption efficiency.

4. The horizontally-laid tangential rooftop wind power generator according to claim 3, wherein the vacuum solar heat collector tubes are arranged in two layers, wherein the tubes of the bottom layer are offset from the tubes of the upper layer such that any seepage of sunshine through the tubes of the top layer can be captured by the tubes of the bottom layer.

5. The horizontally-laid tangential rooftop wind power generator according to claim 3, further comprises a light reflective membrane placed at an underside of the vacuum solar heat collector tubes to reflect seepage of sunshine through the vacuum solar heat collector tubes and the reflected sunshine from surrounding back to the vacuum solar heat collector tubes to enhance solar heat absorption efficiency.

6. The horizontally-laid tangential rooftop wind power generator according to claim 2, wherein the rooftop wind power generator is installed in synergy with a split solar hot water system having a hot water storage cistern placed on ground and a plurality of flat solar heat collector panels mounted on roof, whereby electricity generated by the rooftop wind power generator can be fed to a heating element inside the hot water storage cistern to heat up water, and to a plurality of heater wires paved on surface of the flat solar heat collector panels to melt away covering snow to enhance solar heat absorption efficiency.

7. The horizontally-laid tangential rooftop wind power generator according to claim 2, wherein the rooftop wind power generator is installed in synergy with a rooftop photo voltaic panel system having a plurality of photo voltaic panels, whereby electricity generated by the rooftop wind power generator can be fed to a plurality of heater wires paved on surface of the photo voltaic panels to melt away covering snow to enhance solar heat absorption efficiency.

8. The horizontally-laid tangential rooftop wind power generator according to claim 3, wherein a battery bank is incorporated in an electricity output circuit of the generator such that when the battery bank is fully charged, surplus electricity can be fed to a heating element inside the hot water storage cistern to heat up water, whereby the heating element may act as a dummy load for protection of a power control circuit.

9. The horizontally-laid tangential rooftop wind power generator according to claim 6, wherein a battery bank is incorporated in an electricity output circuit of the generator such that when the battery bank is fully charged, surplus electricity can be fed to the heating element inside the hot water storage cistern to heat up water, whereby the heating element may act as a dummy load for protection of a power control circuit.

10. A horizontally-laid tangential rooftop wind power generator comprising:
  (a) a chassis;
  (b) a generator mounted on the chassis;
  (c) at least one fan wheel mounted horizontally on the chassis and rotatably coupled to the generator;
  (d) a cover with two opposite lateral fan openings to encase the generator and at least one fan wheel; and
  (e) a front shrouded duct and a rear shrouded duct each extending from the two opposite fan openings of the fan wheel respectively, each shrouded duct being formed by a plurality of wind-directing panels extending outwardly from its corresponding fan opening wherein the fan wheel comprises a plurality of wind blades mounted tangentially on two rims of the fan wheel, each wind blade is a long and slim blade having a cross-sectional shape of an arc and with two longitudinal edges slightly extended and folded backwards in line with the chord to form a wind augment zone at the underside of wind blade to enhance efficiency in capturing wind energy;
  wherein an upper edge of a lower wind-directing panel of the front shrouded duct extends to a region at about ¼ diameter height of the fan wheel; while at the rear shrouded duct, a lower edge of an upper wind-directing panel extends to a region at about ¼ diameter height of the fan wheel, whereby the upper and lower wind-directing panels guide passage of wind such that the fan wheel being encased inside the cover is allowed to rotate in one direction only irrespective of the direction of incoming wind.

11. The horizontally-laid tangential rooftop wind power generator according to claim 10, wherein incoming wind is compressed and positively pressurized at a front wind augment zone defined by the front shrouded duct and the rooftop such that incoming wind is forced to diffuse through the fan wheel at an accelerated speed prior to entering into a rear shrouded duct region where pressure is negative, hence helping draw in more volume of air from the front before discharge to open air.

12. The horizontally-laid tangential rooftop wind power generator according to claim 10, wherein the rooftop wind power generator is mounted on the body of a solar hot water system with a heating element inside the hot water storage cistern, and with heater wires paved on surface of vacuum solar heat collector tubes extending from the body of the water storage cistern; the electricity generated by the rooftop wind power generator can be fed to the heating element inside the hot water storage cistern to heat up water, or to a plurality of heater wires paved on surface of the vacuum solar heat collector tubes to melt away covering snow to enhance solar heat absorption efficiency.

13. The horizontally-laid tangential rooftop wind power generator according to claim 12, wherein the vacuum solar heat collector tubes are arranged in two layers, wherein the tubes of the bottom layer are offset from the tubes of the upper layer such that any seepage of sunshine through the tubes of the top layer can be captured by the tubes of the bottom layer.

14. The horizontally-laid tangential rooftop wind power generator according to claim 12, further comprises a light reflective membrane placed at an underside of the vacuum solar heat collector tubes to reflect seepage of sunshine through the vacuum solar heat collector tubes and the reflected sunshine from surrounding back to the vacuum solar heat collector tubes to enhance solar heat absorption efficiency.

15. The horizontally-laid tangential rooftop wind power generator according to claim 10, wherein the rooftop wind power generator is installed in synergy with a split solar hot water system having a hot water storage cistern placed on ground and a plurality of flat solar heat collector panels mounted on roof, whereby electricity generated by the rooftop wind power generator can be fed to a heating element inside the hot water storage cistern to heat up water, and to a plurality of heater wires paved on surface of the flat solar heat collector panels to melt away covering snow to enhance solar heat absorption efficiency.

16. The horizontally-laid tangential rooftop wind power generator according to claim 10, wherein the rooftop wind power generator is installed in synergy with a rooftop photo voltaic panel system having a plurality of photo voltaic panels, whereby electricity generated by the rooftop wind power generator can be fed to a plurality of heater wires paved on surface of the photo voltaic panels to melt away covering snow to enhance solar heat absorption efficiency.

17. The horizontally-laid tangential rooftop wind power generator according to claim 12, wherein a battery bank is incorporated in an electricity output circuit of the generator such that when the battery bank is fully charged, surplus electricity can be fed to a heating element inside the hot water storage cistern to heat up water, whereby the heating element may act as a dummy load for protection of a power control circuit.

18. The horizontally-laid tangential rooftop wind power generator according to claim 15, wherein a battery bank is incorporated in an electricity output circuit of the generator such that when the battery bank is fully charged, surplus electricity can be fed to the heating element inside the hot water storage cistern to heat up water, whereby the heating element may act as a dummy load for protection of a power control circuit.

* * * * *